Patented June 26, 1945

2,379,250

UNITED STATES PATENT OFFICE 2,379,250

PREPARATION OF CARBONIC ACID ESTERS

Irving E. Muskat and Franklin Strain, Akron, Ohio, assignors to Pittsburgh Plate Glass Company, Allegheny County, Pa., a corporation of Pennsylvania No Drawing. Application March 28, 1941, Serial No. 385,772

5 Claims. (Cl. 260—463)

This invention relates to a novel method of preparing carbonate esters of polyhydroxy compounds. These compounds have a structure represented by the following general formula:

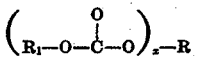

in which R is any organic radical of x valence, $R_1$ is an organic radical such as a hydrocarbon or substituted hydrocarbon radical and $x$ is a small whole number.

In the practice of the invention an hydroxy compound is reacted with a polyhaloformate. The polyhaloformates of the following hydroxy compounds are suitable for the reaction: glycols, glycerols, polyglycols or polyglycerols, such as the alkylene glycols, for example, ethylene glycol, trimethylene glycol, pentamethlene glycol, tetramethylene glycol, propylene glycol or glycerol, alpha or beta methyl glycerol, or mannitol, etc., or the polyhydroxy ethers, polyglycols, polyglycerols, etc., such as the di-, tri-, and tetraethylene glycols, the di-, tri-, and tetrapropylene glycols, and polybutylene glycols, the polyglycerols, or substituted polyglycerols, glycerol mono methyl ether, 1-2,dihydroxy 4 ethyloxy butane, αα-dihydroxy diphenyl ether. Also, the corresponding polyhydroxy thio-ethers such as bis (hydroxy ethyl) sulphide, $(OHC_2H_4)_2S$, hydroxy ethyl hydroxy phenyl thio-ether

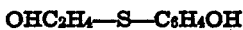

and the cyclic thio-ethers analagous to the above cyclic ethers may be treated. The chlorformates may be made by reacting the polyhydroxy compounds with phosgene in the manner described in copending application Serial No. 385,774, filed March 28, 1941 (Case A-170), for the production of dichloroformates of polyglycols.

The haloformates and preferably chloroformates may be reacted with various mono or polyhydric saturated or unsaturated alcohols such as methyl, ethyl, propyl, isopropyl, butyl or isobutyl alcohol, or other straight or branched chain paraffin alcohols including those of higher molecular weight such as stearyl, dodecyl, cetyl and melissyl alcohols, or the aromatic alcohols such as benzyl, phenylethyl, etc. alcohols or unsaturated alcohols such as allyl, methallyl, crotyl, isocrotyl, cinnamyl, propargyl, tiglyl, or methyl vinyl carbinyl alcohols, citronellol, geraniol, and the higher molecular alcohols including oleyl and linoleyl alcohols, also substituted alcohols such as 2-chloroallyl, 2-bromoallyl, or chlorocrotyl alcohol, 3-chlorobutene 2-ol-1, or other halogen substituted alcohols. Likewise, polyhydric alcohols such as ethylene glycol, propylene glycol, butylene glycol, isobutylene glycol, trimethylene glycol, pentamethylene glycol, or the corresponding polyglycols such as di-, tri-, or tetraethylene glycol, or the corresponding propylene or butylene or isobutylene polyglycols, glycerol, methyl glycerol, polyglycerols such as diglycerin or triglycerin, mannitol, sorbitol, polyvinyl alcohol, hydrated cellulose, cellulose monoacetate, cellulose mono butyrate, starch, sugars, aromatic alcohols such as phthalyl alcohols, may be reacted with polychloroformates in accordance with this invention. In addition, hydroxy acid such as lactic, glycollic, tartaric, citric, hydroxy butyric, salicylic, ricinoleic, acids or the esters of such acids may be treated.

The more important of the chloroformates useful in the practice of this invention are those derived from the glycols and polyglycols. These chloroformates react with alcohols to produce carbonate esters. The reaction may be promoted by the presence of an alkaline reagent including, organic bases such as pyridine, dimethyl aniline, quaternary ammonium bases such as trimethyl phenyl ammonium hydroxide, or inorganic bases such as the oxides, hydroxides, and carbonates of sodium, potassium, calcium, barium, strontium, and magnesium or other alkaline earth metal, or alkali metal. The alkaline agent may be in solution or may be dispersed as a finely pulverized solid material. Thus, finely divided calcium carbonate has been found to be especially effective.

Water may be present or the reaction may be conducted under substantially anhydrous conditions. It may, under some circumstances, be desirable to add diluents such as water, acetone, carbon tetrachloride, or dioxane.

The temperature of the reaction will depend upon the nature of the alkaline reagent used. When pyridine or caustic soda is used, temperatures less than normal room temperature (15–25° C.) are required, such lower temperatures generally favoring higher yields. When calcium carbonate is used as the alkaline reagent it is desirable to operate at higher temperatures, preferably above 50° C. Yields may be varied by controlling the concentration of reactants. Thus, by using an excess of both alcohol and alkaline reagent almost quantitative yields can be obtained in many cases. When operating under such circumstances the excess of reagents may be recovered and used in subsequent preparations.

Various compounds may be produced. Thus, the unsaturated esters such as are described in our copending application Serial No. 361,281, filed October 15, 1940, for example, ethylene glycol bis (allyl carbonate), ethylene glycol bis (methallyl carbonate), diethylene glycol bis (allyl carbonate), etc., may be formed. Likewise, the corresponding saturated esters such as ethylene glycol bis (methyl carbonate), ethylene glycol bis (ethyl carbonate), ethylene glycol bis (propyl carbonate) etc. may be produced. In addition, resinous condensation products may be produced by reaction of polyhydric alcohols with polychloroformates. Thus, ethylene glycol dichloroformate or the corresponding polychloroformates may be heated in the presence of an alkaline agent with ethylene, propylene, or butylene glycol or polyglycol, or with glycerol, methyl glycerol, or glycerol mono esters of unsaturated acids, ethers of unsaturated alcohols such as glycerol mono acrylate, mono chloroacrylate, or mono methacrylate or glycerol mono allyl ether, resorcinol, cresol, phthalyl alcohol, tartaric acid or esters thereof, or other polyhydroxy compound to form an alkyd type of resin.

Similarly, other di- or trichloroformates or other polychloroformates such as glycerol trichloroformate, resorcinol dichloroformate, etc., may be reacted with methyl, ethyl, allyl, propyl, methallyl, etc. to form esters which may be resinous in nature if polyhydric alcohols are utilized.

The following examples are illustrative:

Example I

A 75 gm. sample of ethylene glycol bis (chloroformate) was mixed with 1.2 moles of methallyl alcohol representing 150% of the theoretical requirements for complete esterification. The mixture was placed in a three-necked flask equipped with stirring device, thermometer, and reflux condenser. A slight excess (5%) of 50% NaOH was added slowly over a period of 81 minutes. The reaction vessel was maintained at a temperature between 5 and 9° C. by artificial cooling. After the mixing was completed the mixture was stirred for 30 minutes at a temperature between 4 and 7° C. The ethylene glycol bis (methallyl carbonate) was purified by distillation at 2 mm. pressure. A yield of 53% was obtained.

Example II 5 moles of diethylene glycol bis chloroformate was added gradually to a mixture of 11 moles of methallyl alcohol, 11.2 moles of pyridine and 850 cc. of benzene. The mixture was maintained at about 10° C. through the reaction and uniform conditions were maintained in the reaction vessel by vigorous stirring. The benzene solution was washed twice with 6 N HCl until the mixture was acid to xylene cyanole and then washed with sodium chloride solution until neutral to litmus. After decolorizing with charcoal, the solvent was evaporated on a steam bath and the diethylene glycol bis (methallyl carbonate) was purified by distillation at a pressure of 2-3 mm. A yield of 84% was produced.

Example III

A 75 gm. sample of ethylene glycol bis chloroformate was mixed with 150% excess of methallyl alcohol over the stoichiometric amount and with 150% excess of finely divided calcium carbonate in a three-necked flask equipped with stirrer and reflux condenser. The mixture was heated for 13 minutes between 85–120° C. and subsequently for 75 minutes between 120 and 125° C. The product was washed with very dilute hydrochloric acid and heated to 115° C. while passing a stream of $CO_2$ through the mixture. This procedure caused the separation of the unreacted methallyl alcohol. The mixture was then distilled under vacuum at a total pressure of 2 mm. 70.4 gms. of ethylene glycol bis (methallyl carbonate) was collected between 138 and 144° C.

Example IV 1.2 moles of methallyl alcohol were gradually added to .5 mole of dipropylene glycol bis chloroformate, 1000 cc. of benzene and .6 mole of finely divided calcium carbonate. The temperature was maintained between 100° C. and 125° C. during the addition which required 35 minutes. The mixture was permitted to remain at temperature for 15 minutes after the addition was completed. The product was washed with hydrochloric acid and water. The excess alcohol and the benzene were distilled off at atmospheric pressure and the propylene glycol bis (methallyl carbonate) purified by vacuum distillation.

Example V 75 gms. of ethylene glycol bis chloroformate was mixed with 1.2 moles of methallyl alcohol (150% of theoretical). The mixture was placed in a flask provided with a reflux condenser and a stirrer. No alkaline reagent was used. The mass was heated and maintained between the temperatures of 37 and 108° C. for 208 minutes. Ethylene glycol bis (methallyl carbonate) was produced but the yield was only 13%.

Example VI 5 moles (935 gms.) of ethylene glycol bis chloroformate was added slowly to a mixture of 352 gms. of methyl alcohol (10% excess) and 950 cc. of pyridine (20% excess). The addition was begun at the rate of about 1 mole per hour and toward the end of the reaction the dichloroformate was added at the rate of 1.5 moles per hour. The temperature was maintained at about 5° C. The reaction mass was permitted to warm to room temperature and was acidified to pH 3 with sulphuric acid. It was washed successively with dilute sulphuric acid, 5% caustic soda and water. The excess methyl alcohol was evaporated on a steam bath and the ethylene glycol bis (methyl carbonate) was purified by vacuum distillation.

Example VII 2 moles of ethylene glycol bis chloroformate (374 gms.) was mixed with 300 gms. of finely divided calcium carbonate in a reaction vessel equipped with reflux condenser and a stirring device. Ethyl alcohol was added slowly over a period of about 2 hours at the rate of 1.5 moles per hour. This represented an excess of 50%. The reaction temperature was maintained between 60 and 80° C. during the reaction. After the reaction was completed, the mixture was permitted to cool, transferred to a water bath and the excess ethyl alcohol was evaporated. The crude ethylene glycol bis (ethyl carbonate) was washed with dilute hydrochloric acid and water.

Example VIII

A mixture of 375 gms. of ethylene glycol bis chloroformate, 180 gms. of isopropyl, 1000 cc. of benzene and 300 gms. of calcium carbonate was mixed in a three-liter flask equipped with a reflux condenser. The reaction was gradually heated to 70° C. for over a period of one-half hour. The reaction mass was then maintained between the temperatures of 70-90° C. for an additional hour. When the products were cooled they were washed with 5% hydrochloric acid and with water. The benzene and excess alcohol were removed by distillation at atmospheric pressure while the ethylene glycol bis (isopropyl carbonate) was purified by distillation at 2 mm. pressure.

Example IX

A mixture of 106 gms. of diethylene glycol bis chloroformate and 107 gms. of pyridine was prepared in a flask equipped with reflux condenser and with a stirring mechanism. 50 gms. of methyl alcohol were added slowly over a period of about two hours. During the reaction the temperature rose to about 50° C. The products were washed with dilute acid, separated from impurities by distillation and decolorized by heating with activated charcoal. Pure diethylene glycol bis (methyl carbonate) was produced.

Example X

A mixture of 2.2 moles of methallyl alcohol and 3 moles of sodium hydroxide was prepared. To this one mole of diethylene glycol bis chloroformate was gradually added. The mixture was not cooled and the heat of reaction increased the temperature to a maximum of 40° C. The diethylene bis (methallyl carbonate) was purified as in Example I. A yield of 4.9% was produced.

Example XI

A mixture of 5 moles of diethylene bis chloroformate and 15 moles of finely divided calcium carbonate was prepared in a three-necked flask equipped with a reflux condenser and a stirring mechanism. Fifteen moles of allyl alcohol were added gradually over a period of 1 and ½ hours. The reaction mass was heated to 50-70° C. during the first hour and 70-90° C. during the last thirty minutes. The diethylene bis (allyl carbonate) was washed with dilute hydrochloric acid and purified by distillation.

Example XII

To a mixture of 150 g. of allyl alcohol and 187 g. of ethylene glycol bis chloroformate was added slowly with stirring 200 g. of cold 50% aqueous sodium hydroxide, keeping the temperature at 0-5° C. The reaction mixture was diluted with water, and the oily ester separated and distilled. Colorless glycol bis (allyl carbonate), B. P. 130-140° C. at 1.2 mm. pressure was obtained.

Example XIII

The process of Example XII was repeated using an equivalent quantity of 2-chloroallyl alcohol in lieu of allyl alcohol and the corresponding ester glycol bis (2-chloroallyl carbonate) was obtained.

Example XIV 5 moles (935 gms.) of distilled ethylene glycol bis chloroformate was added slowly to a mixture of 929 cc. of methallyl alcohol (10% excess) and 954 cc. of pyridine (20% excess). The addition was made at a rate of 1.5 moles per hour and the temperature maintained about 5° C. After the reaction mixture had been permitted to warm to room temperature it was diluted with water. The ester was washed successively with 5% sulphuric acid, 5% caustic soda and water. It was decolorized with charcoal by heating 80-100° C. while evacuating at 15 mm. to remove methallyl alcohol. 915 gms. of ethylene bis (methallyl carbonate) were collected between 135 and 145° C. by distillation at a pressure of 3 mm.

The above examples describe dichloroformates. It should be understood that the invention is equally applicable to polychloroformates containing more than two chloroformate groups. Similarly, other haloformates containing two or more haloformate groups such as the corresponding bromoformates may be used.

Although the invention has been described with reference to specific details of certain modifications thereof, it is not intended that such details shall be regarded as limitations upon the scope of the invention except insofar as included in the accompanying claims. This case is a continuation-in-part of Serial No. 361,280, filed October 15, 1940.

We claim:

1. A method of preparing a glycol bis (saturated alcohol carbonate) ester which comprises reacting a dichloroformate of a glycol with a saturated monohydric alcohol in the presence of a basic reagent.

2. A method of preparing ethylene glycol bis (saturated alcohol carbonate) which comprises reacting ethylene glycol dichloroformate with a saturated monohydric alcohol in the presence of an alkaline reagent.

3. A method of preparing glycol bis (ethyl carbonate) which comprises reacting ethylene dichloroformate and ethyl alcohol in the presence of an alkaline reagent.

4. A method of preparing glycol bis (methyl carbonate) which comprises reacting ethylene dichloroformate and methyl alcohol in the presence of an alkaline reagent.

5. A method of preparing an ethylene glycol bis (saturated carbonate) which comprises reacting ethylene dichloroformate with saturated monohydric alcohol in the presence of finely divided calcium carbonate at a temperature above 50° C.

IRVING E. MUSKAT.
FRANKLIN STRAIN.